United States Patent Office.

LOUIS LA BRECHE-VIGER, OF MONTREAL, CANADA, ASSIGNOR TO WILLIAM W. AVERELL, OF BATH, N. Y.

Letters Patent No. 95,358, dated September 28, 1869; reissue No. 3,835, dated February 15, 1870; reissue No. 4,153, dated October 11, 1870.

IMPROVEMENT IN THE MANUFACTURE OF CAST-STEEL.

The Schedule referred to in these Letters Patent and making part of the same

*To all whom it may concern:*

Be it known that I, LOUIS LA BRECHE-VIGER, of Montreal, in the Province of Quebec, in the Dominion of Canada, have invented a new Mode of Making Cast-steel at one operation, of a homogeneous character, and of any desired quality, by the use of the admixture in predetermined and definite proportions:

First, of pulverized plumbago, anthracite, or bituminous coal or coke, compressed into suitable forms, or used in the loose state, with pulverized iron ores, or oxide of iron, and also with what is called magnetic-iron sand-ore, with wrought iron, iron scraps, iron shavings, iron chips, and with what is styled iron or steel-sponge, either in clay or other non-fusible pots or crucibles, or in a reverberatory or other suitable furnace.

Second, of powdered charcoal, compressed into suitable form with the above-mentioned ores or oxide of iron, iron-sand ore, wrought iron, scraps, shavings, chips, and sponge, in clay crucibles or other non-fusible pots; and also of the same admixture, whether it be compressed or used in the loose state, in a reverberatory or other suitable furnace.

The following is a description of the process:

*I.—To determine the exact proportion of the carbon in any one of the above admixtures.*

The manufacturer must have accurate analyses of the ores, iron-sand ore, and of the carbonaceous matter to be used, by which the quantities of iron and oxygen present, and the amount and character of the impurities of the ore, as well as the reliable amount of carbon and impurities of the carbonaceous matter are made known.

Then, by applying the well-known proportions which exist between the chemical equivalents of iron, oxygen, and carbon, to the given weights of iron and oxygen present in the ore or oxide of iron, the quantity, by weight, of carbon, required for reduction, will be known; to which will have to be added that required to carburize the resulting iron to any desired degree.

*II.—Required conditions.*

To insure uniformity in the cast-steel, the ores and carbonaceous matters used should be as pure as practicable, and uniform in character and quality.

The ores or oxides of iron, and the carbonaceous matters used, must be finely and uniformly pulverized, and when weighed must be dry.

The ore should be separated as far as practicable from all impurities, especially sulphur and phosphorus.

When anthracite or bituminous coal or coke are the carbonaceous matters used, they must be desulphurized as nearly as possible by careful washing and subsequent heating.

*III.—Definite admixture.*

To any given quantity of pulverized ore in which the quantity of oxide of iron is known add a sufficient quantity, by weight, of pulverized carbon, to eliminate the oxygen, together with the quantity of carbon required to carburize the resulting iron to the required degree.

To the mixture may be added oxide of manganese, the amount of which, for any desired quality of steel, may be easily determined by observing and comparing a few results.

Lime, or fluate of lime, may be added, in equal proportion, to the silicious matters present in the ore.

The fluate of lime is believed also to exert a beneficial influence where injurious effects of sulphur in the carbonaceous matter, or of phosphorus in the ores, are apprehended.

After weighing the materials they should be thoroughly, intimately, and uniformly mixed.

*IV.—Compression.*

The object and advantages of compression are:

First, the particles of oxide of iron and carbon are brought nearly to contact, and more convenient for reduction and carburization.

Second, more matter can be charged at one operation, particularly in crucibles, rendering thereby profitable an operation which could not otherwise be so.

Third, the conduction of heat through the admixture is increased and facilitated, whereby time is saved in reduction and fusion.

Fourth, when compressed, the blocks may easily be coated to preserve crucibles and furnace-hearths, which cannot so readily be accomplished when the admixture is in a loose state.

To compress the admixture into blocks or bricks of any convenient size, from one to eight per centum of the weight of oxide of iron used, of wood-tar, may be added to the admixture, to cement it, careful account being taken of the amount of carbon contained in the tar in the determination of proportions. This percentage of wood-tar will be diminished as the degree of compression is increased.

For small operations, the compression may be effected by manual labor; for extensive manufacture, by machinery, that of impact being best, one machine being capable of compressing twenty tons per day.

After compression, the blocks should be stacked up and allowed to dry. The drying may be accelerated by storing them in a room or oven previously heated.

*V.—Coating.*

First, if it be intended to use the admixture in a loose state, either in a crucible or in a furnace, from one to five per centum of pulverized plumbago should first be thoroughly mixed with the ore or oxide of iron, so that each particle may receive a coating of carbon; after which, any of the above-mentioned carbons may be added, and the admixture completed, as before described.

Second, if the compressed admixture be used, after the blocks are dried, they should receive a light coating of dry plumbago; or plumbago made into a thin paste with water. The amount of plumbago thus used as coating in either case should be taken into account as forming a part of the proportion of carbon required to deoxidize the ore and carburize the metal to the extent required.

*VI.—Object of the coating.*

The oxide of iron, strongly heated, in contact with silicious matters, readily combines with the silica, and thereby destroys any crucible or furnace-hearth exposed to its action.

By coating each particle of finely-pulverized ore with that amount of carbon sufficient to effect its reduction, this affinity of the iron-ore for silica is neutralized, and silicious crucibles or furnace-hearths may then be used.

*VII.—To use the admixture in crucibles.*

In a loose state, the admixture in which charcoal is the carbon, should never be used in crucibles. The volume of the charcoal would render the product too inconsiderable for profitable manufacture; but when it is so used, or when the admixture, as to carbon, is plumbago, anthracite, or bituminous coal, or coke, used in the same way, the crucible is filled, covered, and heated until fusion takes place, when the steel is cast into ingots; but, particularly in crucibles, it is preferable to use all the above-named admixtures in a compressed state, fitting the crucible.

*VIII.—To use the admixture in a furnace.*

Crucible operations are of little consequence compared to those in a furnace.

For this process any heating, puddling, or gas-furnace of any kind may be used, and particularly the Siemen's furnace.

The bottom or hearth of the furnace should be carefully made of silicious sand, closely packed and slightly hollowed or dished on its surface, with a gentle slope toward the tapping-hole.

When the hearth has been glazed by a sufficient heat, the admixture, loose or in bricks, is charged. If loose, the upper surface is leveled; if compressed, which is far preferable, the bricks cover the bottom closely, like a pavement.

*IX.—Covering.*

In either condition, loose or compressed, the admixture, as soon as charged, is covered with a quantity of broken glass or blast-furnace or other furnace-cinder, or glass-making materials, so as to make, when melted, a perfect covering of not less than one inch in depth.

The object of the covering is to prevent the reoxidation of the metal when the flame is an oxidizing one, and its over-carburization when the flame is carburizing.

When a neutral flame can be created no covering will be required.

*X.—Melting.*

After the covering is placed the furnace is closed and heated, only one man being required to attend the operation.

During reduction, an ebullition of escaping gas is observed in the molten covering. When reduction is finished this boiling ceases.

It may be ascertained by feeling with a small iron rod when the cast-steel is completely fused.

It is then tapped out and cast into ingots, care being taken to prevent any accidental admixture of sand with the metal in the molds.

*XI.—Practical proportions.*

An excellent cast-steel has been produced in a furnace by the use of an admixture of the following proportions, viz:

One hundred pounds iron ore, nearly pure, nineteen to twenty pounds selected anthracite coal, eight pounds of wood-tar, four pounds of oxide manganese, one pound of fluate of lime, with a coating of one-eighth pound of plumbago.

The time required for reduction and fusion in a puddling-furnace is from four to six hours, depending upon the steadiness and intensity of the heat applied.

I do not claim the use of powdered charcoal as a reducing and carburizing agent in principle.

What I claim as peculiarly my invention is—

1. The admixture, in predetermined and definite proportions, of pulverized plumbago, compressed or not, with pulverized iron ores, oxide of iron, carbonate of iron, iron-sand, or iron, to make cast-steel of any desired quality in one operation.

2. The admixture, in predetermined and definite proportions, of pulverized anthracite or bituminous coal, coked, or in the natural state, compressed or not, with pulverized iron ores, oxide or carbonate of iron, iron-sand, or iron, to make cast steel of any desired quality in one operation.

3. The admixture, in predetermined and definite proportions, of pulverized plumbago, pulverized anthracite or bituminous coal, pulverized coke, compressed or not, with pulverized iron ores, oxide or carbonate of iron, iron sand, wrought-iron, iron scraps, shavings, chips, and sponge, in a crucible, or in a reverberatory furnace, or reheating or puddling or air-furnace, or in what is called and known as a Siemens' furnace, or in any furnace heated by gas, to make cast-steel of any desired quality in one operation; the said mixture, if used in a furnace, to be covered, or not, with a flux of glass or blast-furnace or other furnace-cinders, or with glass-making materials, or with slabs of soapstone, or with tiles or fire-bricks; or if the ore or carbon used contains earthy matters the slags scoriæ which they will furnish may render other covering unnecessary. In a furnace heated by gas, if a neutral flame, neither oxidizing nor carburizing can be produced, no covering is required.

4. The admixture, in predetermined and definite proportions, of powdered charcoal, compressed with pulverized iron ores, oxide or carbonate of iron, iron sand, and wrought-iron, or metallic iron of any description in a crucible, to make cast-steel of any desired quality in one operation.

5. The admixture, in predetermined and definite proportions, of pulverized charcoal, compressed or not, with iron ores, oxides or carbonates of iron, iron-sand, or with metallic iron of any description, in any of the furnaces, and with or without the covering mentioned in No. 3 of this claim, to make cast-steel, of any desired quality, in one operation.

6. The above admixtures, in the following proportions, viz: from two-tenths of one per cent. to thirty per cent., and even thirty-five per cent. of said carbons, in weight, of the ore used, or of the oxide of iron, or carbonate of iron, or iron, according to the purity of the oxide or carbonate of iron, and of the carbon used, and according also to the quality of the cast-steel to be produced.

7. The above admixtures, either in a loose or compressed state, with a coating of plumbago or other carbonaceous matter, in the manner and for the purpose substantially as set forth in the foregoing specification.

LS. LA BRECHE-VIGER.

Witnesses:

THOMAS A. FORAN,

LEOPOLD LAFLAMME.